Nov. 22, 1932.  C. F. MASKUS  1,888,323
MOWING MACHINE
Filed Feb. 24, 1931
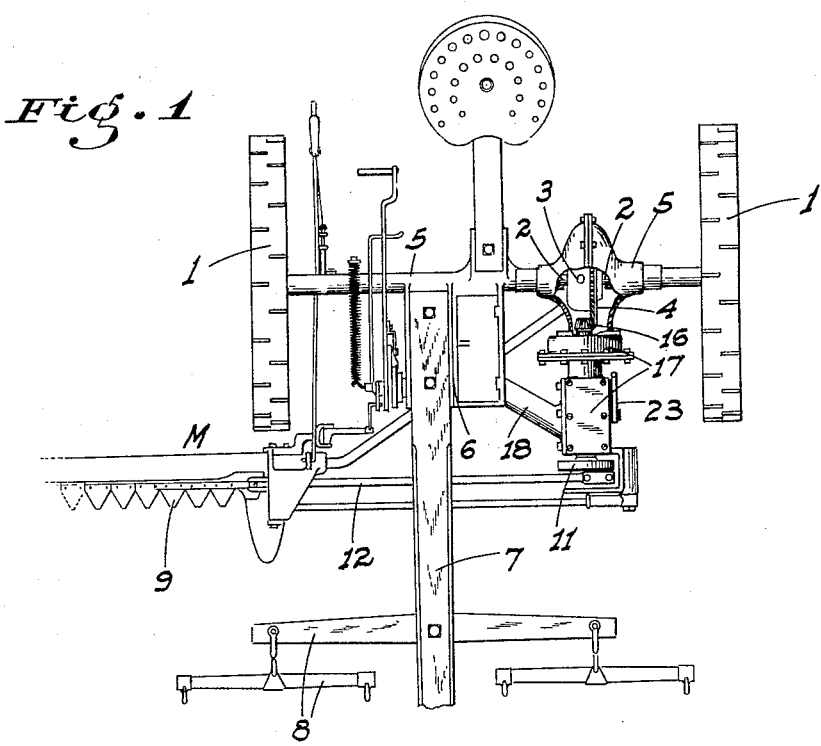
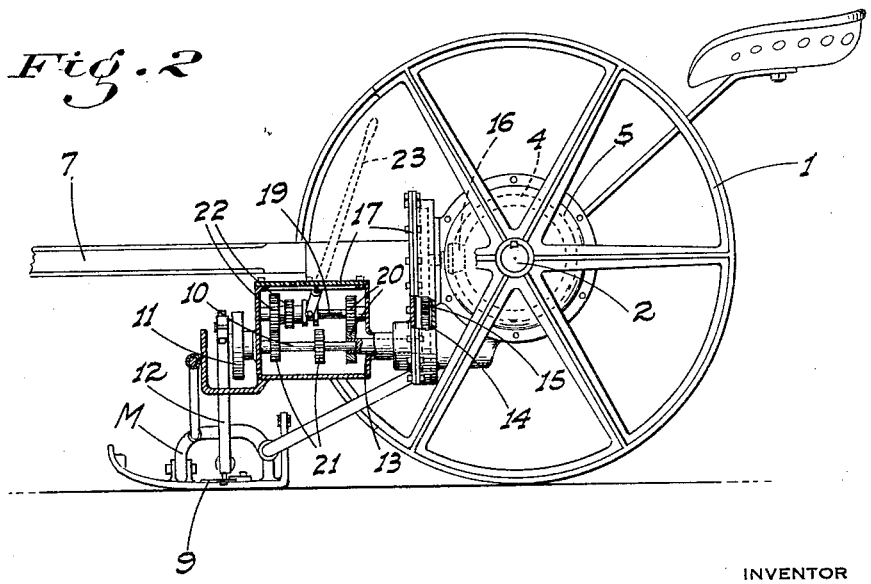
INVENTOR
C. F. Maskus
BY
ATTORNEY Patented Nov. 22, 1932

1,888,323

UNITED STATES PATENT OFFICE

CARL F. MASKUS, OF RIPON, CALIFORNIA

MOWING MACHINE

Application filed February 24, 1931. Serial No. 517,739.

This invention relates to mowing machines, and particularly to that type which forms a complete unit of itself and in which the rotation of the supporting wheels of the mower supply power to operate the knife bar.

The principal object of my invention is to provide a machine of this general character in which the driving connections between the wheels and the pitman of the knife bar are concealed and protected throughout from contact with dirt and the like, and in which different speeds of the knife bar may be selectively had with a constant speed of rotation of the wheels. The knife bar may therefore be driven at a normal speed even though the wheels are turning very slowly. This is especially of benefit with horse-drawn mowers, since the animals are apt to slow down when the mower is operating in an excessively heavy growth, and with the ordinary knife bar driving arrangment said bar is then reciprocated so slowly that the cutting action is very inefficient.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a top plan view of my improved mower.

Fig. 2 is a side elevation of the same, partly broken out and in section.

Referring now more particularly to the characters of reference on the drawing, the numeral 1 denotes a pair of transversely spaced ground engaging wheels, each having a separate axle 2. The axles are fixed to the respective wheels and are longitudinally aligned with but separate from each other. At their adjacent ends they are connected in driving relation by a differential mechanism 3 of the usual character used in automotive practice and with which the driving or master gear 4 is associated. The axles and differential are enclosed and supported by a rigid housing 5, on which is mounted a forwardly extending bracket 6 which forms the support for the tongue 7, to which the doubletree unit 8 is connected.

Disposed to the side of the machine ahead of the wheels and connected thereto for the necessary adjustments, is a conventional mower device M, which includes a reciprocating knife bar 9, and it is in the improved means for driving this bar that my invention resides. Such means is constructed as follows:

Disposed at the proper level relative to the knife bar is a longitudinally extending shaft 10, on the forward end of which is a crank wheel 11. This wheel is connected to the adjacent end of the pitman 12 which extends to and drivingly engages the adjacent end of the knife bar in the usual manner. This shaft is aligned with but separate from a rearwardly extending shaft 13. At its rear end the shaft 13 is secured to a spur pinion 14, which engages a spur gear 15. Fixed with the gear 15 is a bevel pinion 16 which engages the driving gear 4.

All the gearing and shafts are enclosed in a unitary housing structure 17 which is rigidly connected with the housing 5, and while it is necessary for the purpose of manufacture to make this housing structure in a number of parts, it is continuous from end to end and forms in effect a single unit and enclosure from the wheels 1 to the crank wheel 11. A necessary bracing effect for the housing structure is provided by a rib 18 connecting the forward portion of the housing with the bracket 6.

The sets of gears 4—16 and 15—14 speed up the rotation of the shaft 13 considerably over the speed of rotation of the wheels and axles, and to permit the shaft 10 to be driven from the shaft 13 at the same or different speeds, or to be disconnected from any driving relation therewith, I provide the following structure:

Mounted in the forward portion of the housing 17 is a counter-shaft 19, parallel to and preferably above the shaft 10. This counter-shaft is permanently connected in driving relation with the shaft 13 by gearing 20. Fixed on the shaft 10 are spaced gears 21 of different sizes, which are arranged to alternately mesh with gears 22 of correspondingly different sizes, arranged as a unit slidably splined on the shaft 19. The gears 21 are disposed relative to the gears 22 so that the latter may be shifted to a position between said gears 21 and not in mesh with either one, so that the driving of the shaft 10 and the knife bar may be discontinued. The sliding gear unit 22 is shifted at will by a suitable lever 23, mounted in connection with and projecting upwardly from the housing 17.

By means of this arrangement it will be seen that all the working parts of the driving mechanism, except the pitman, are enclosed and the speed of the knife bar may be kept up to normal or approximately so, even though the machine itself is moving very slowly. Also, the shaft 10 is arranged so that not only is the pitman kept in the proper sloping relation to the knife bar, but the crank pin of the pitman on the wheel 11 is parallel to the knife bar so that there is no binding of the pitman or wobbling movement of the same as it reciprocates, which tends to cause rapid wear and excessive vibration.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A driving mechanism for a mower comprising the combination of a pair of mower supporting and driving wheels, a two piece axle driven by the wheels, a differential gearing connected in driving relation with the axle elements, a separate speed step up gearing connected in driving relation with the differential gearing, a pitman, a train of gears connected in driving relation between the speed step up gears and pitman, such train normally driving the pitman at the speed of the step up gears, and means interposed in the train of gears operable to selectively change the speed ratio thereof to increase the speed of the pitman, and a sickle connected in driving relation with the pitman.

2. A driving mechanism for a mower comprising the combination with a pair of mower supporting and driving wheels of a two piece axle driven by the wheels, differential gearing connecting the axle elements, a housing inclosing the differential gearing, a vertical housing connected to the differential gear housing immediately to the front thereof, speed step up gearing arranged in the second housing in driving relation with the differential gearing, a two piece drive shaft interposed between the speed step up gearing and the pitman of the mower, a housing around and supporting such shaft elements and a change speed gearing inclosed and supported within the housing and arranged in driving relation with the two shaft elements for selectively controlling the speed of the pitman relative to the speed step up gearing, and a sickle connected in driving relation with the pitman.

3. A driving mechanism for a mower comprising a pair of mower supporting and driving wheels, a two element axle driven by the wheels, a differential gearing connecting the axle elements in driving relation, a driving bevel gear associated with the differential gearing, a smaller bevel gear driven by such first bevel gear, a spur gear driven by the last named bevel gear, a smaller spur gear driven by the first spur gear, a two element shaft projecting axially of the second spur gear one element connected with the gear and the other with the pitman of the mower, a train of gears connecting the shaft elements in driving relation with each other and adapted to normally drive them at the same speed and operable to selectively increase the speed of the pitman element relative to the spur gear element, and a sickle connected in driving relation with the pitman.

In testimony whereof I affix my signature.

CARL F. MASKUS.